United States Patent [19]

Perry

[11] Patent Number: 5,074,830
[45] Date of Patent: Dec. 24, 1991

[54] CONTINUOUSLY VARIABLE TRANSMISSIONS

[76] Inventor: Forbes G. Perry, Long Meadow, Church St., Charlbury, Oxon, United Kingdom, OX7 3PP

[21] Appl. No.: 671,782

[22] PCT Filed: Oct. 12, 1989

[86] PCT No.: PCT/GB89/01208
§ 371 Date: Mar. 25, 1991
§ 102(e) Date: Mar. 25, 1991

[87] PCT Pub. No.: WO90/04121
PCT Pub. Date: Apr. 19, 1990

[30] Foreign Application Priority Data
Oct. 14, 1988 [GB] United Kingdom ............ 8824133.6

[51] Int. Cl.⁵ .............................................. F16H 37/06
[52] U.S. Cl. ...................................... 475/216; 475/186
[58] Field of Search ................................ 475/214-219, 475/185, 186

[56] References Cited

U.S. PATENT DOCUMENTS

| | | | |
|---|---|---|---|
| 3,866,490 | 2/1975 | Orshansky, Jr. | 475/217 X |
| 4,628,766 | 12/1986 | de Brie Perry | 475/216 |
| 4,682,511 | 7/1987 | Wittke | 475/218 |
| 4,872,371 | 10/1989 | Fellows | 475/216 |
| 4,885,955 | 12/1989 | Kraus | 475/216 X |

FOREIGN PATENT DOCUMENTS

| | | | |
|---|---|---|---|
| 1440883 | of 1966 | France . | |
| WO89/09898 | 10/1989 | PCT Int'l Appl. . | |
| 957145 | 5/1964 | United Kingdom . | |
| 2108599 | 5/1983 | United Kingdom | 475/216 |

Primary Examiner—Dwight Diehl
Attorney, Agent, or Firm—Walter C. Farley

[57] ABSTRACT

A continuously variable transmission includes a toroidal race rolling traction unit (5) which is connectable in distinct regimes to an output rotary member (18) by way of an epicyclic gear stage (19-21). Devices are provided for interrupting or inhibiting the action of the epicyclic gear stage so as to provide at least one fixed transmission ratio of low loss within the range of continuously variable transmission ratios that the rolling race unit can provide.

6 Claims, 5 Drawing Sheets

CONTINUOUSLY VARIABLE TRANSMISSIONS

This invention relates to continuously variable transmissions of the kind having a toroidal race rolling traction unit in which the attitude of rollers between two discs defining the toroidal race may be adjusted in unison to vary a transmission ratio. More particularly the invention relates to a system in which the toroidal race rolling traction unit can be connected in two distinct ways to a final output so that the transmission has two regimes, in one of which the ratio of the rolling traction unit is varied though its full range and the overall transmission ratio varies through the lower part of its full range and in the other of which the ratio of the rolling traction unit varies back through its full range and the overall transmission ratio varies through the upper part of its full range. These two regimes, usually termed 'low' and 'high' regimes, may be provided by way of two different connections of the rolling traction unit to a final output, one connection being by way of an epicyclic stage and the other being a more direct geared or chain connection.

An object of the present invention is to provide a continuously variable speed ratio, preferably by means of a rolling assembly of the kind described, but to provide also at least one and preferably more than one, fixed overall transmission ratio which exhibits lower loss than normal and which is obtained by by-passing the variable unit altogether.

According to the present invention there is provided a transmission comprising an input rotary member, an output rotary member, a variable ratio unit driven by the input member and adjustable to provide a transmission ratio, between the input member and an intermediate member, which is continuously variable throughout a range, a first transmission coupling connectable between the intermediate member and the output member, a second transmission coupling connectable between the intermediate member and a rotary gear member which is disposed in an epicyclic gear stage, the output rotary member including a carrier for an epicyclic gear between the said rotary gear member and a geared driven by the input member and means operable to inhibit at least partially the epicyclic action of the epicyclic gear stage, so as to bypass the variable ratio unit and to provide a fixed overall transmission ratio within a range of continuously variable overall transmission ratios.

The invention will now be described by way of example with reference to the accompanying drawings.

DETAILED DESCRIPTION

Figure 1:
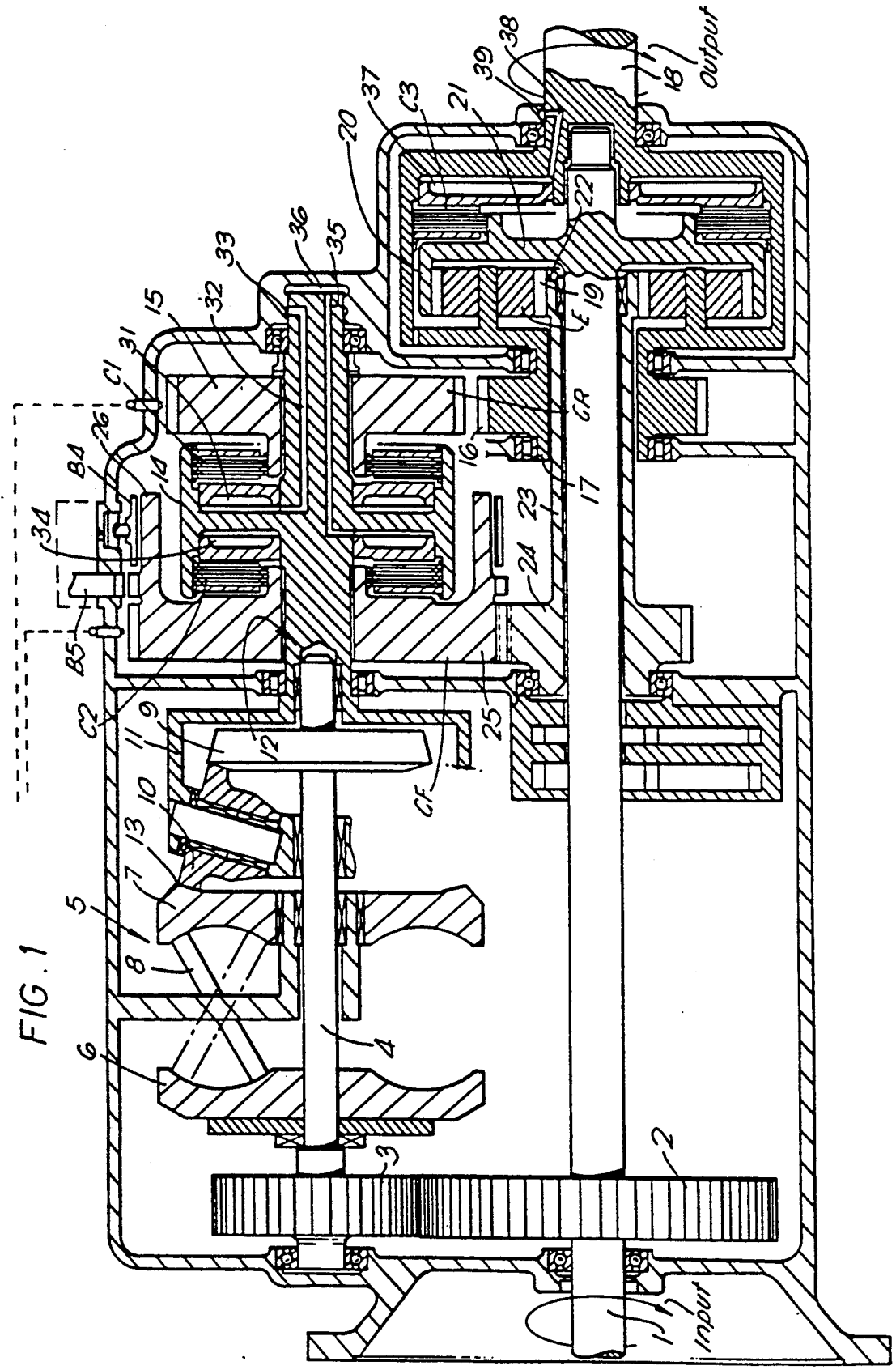
FIG. 1 is a schematic diagram of a continuously variable ratio transmission embodying the invention.

In the transmission shown in FIG. 1 an input or main shaft 1 has at its input end a gear 2 which meshes with an input gear 3 on a shaft 4 that extends through a toroidal race rolling traction unit 5. This unit is of generally known form and comprises an input disc 6, keyed to the shaft 4 an output disc 7, rotatable with respect to the shaft 4, and a set of rollers 8, the attitudes of which can be varied in unison to adjust a transmission ratio between the discs 6 and 7, which define a toroidal race for the rollers 8.

The shaft 4 also carries a disc 9 which is engaged by a set of epicyclic rollers 10 (of which only one is shown) which are carried in a rotary carrier 11 formed as an extension to a shaft 12 which is in this arrangement coaxial with the shaft 4. The rollers 10 also engage the rear surface 13 of the output disc 7 to complete an epicyclic system and also to constitute a thrust bearing for the unit 5. The shaft 12 has a T-flange 14 which can be coupled to a gear 15 by means of a clutch C1. The gear 15 connected by a chain (or idler gear) to a geared annulus 16 formed on an inward extension 17 from an output shaft 18. This constitutes one connection of the rolling assembly to the final output and defines one of the aforementioned 'regimes'. The extension 17 is a carrier for epicyclic gears 19 which mesh with an annulus 20 formed as an axial extension from a flange 21 on the main shaft 1. The gears 19 also mesh with a sun gear 22 formed on a sleeve 23 disposed on the shaft 1. The sleeve has at its other (left-hand) end a gear 24 in mesh with a gear 25 which rotates about the shaft 12. This gear has an ax :1 flange 26, described in more detail later. The second regime is provided by the engagement of clutch C2, so that the rolling assembly drives the final output member 18 by means of the epicyclic train, the final output member being driven by virtue of the speed difference between the input shaft, and hence annulus 20, and the sun gear 22, which is driven by way of gear 25 from the rolling assembly.

The unit 5 in combination with its epicyclic roller stage (9,10,11) has what is known as a geared idle condition in which the discs 7 and 9 are contra-rotating but the output carrier is stationary. The output from the rolling assembly can be varied continuously from reverse, through geared idle to forwards, the ratio of maximum reverse speed to maximum forward speed depending on the range of variation available in the unit 5 and the proportions of the epicyclic roller stage.

Like the system described in the earlier GB patent application No. 8808907.3, the changeover between the two regimes can be achieved without shock using the clutches C1 and C2, because the highest speed in the 'low' regime corresponds to the lowest speed in the high regime.

The clutch C1 is operable to couple the output member 12, 14 of the roller epicyclic with the gear 15 whereas the clutch C2 is operable to couple the output member of the roller epicyclic with the gear 25.

Thus, at the maximum forward speed in the 'low' regime the clutch C2 may be engaged synchronously with gear 25 and then clutch C1 may be released. The rolling assembly 5 is then connected to the sun gear 22 which is being driven at maximum speed in the reverse direction to the output. This provides the lowest speed ratio in the 'high' regime.

As the output speed of the rolling assembly reduces, by variation of the attitude of the rollers 8, the epicyclic carrier 17 speeds up. When the rolling assembly reaches its geared idle condition, the output speed of the epicyclic gear train 21, 19, 17 is $E/(E+1)$ times the input speed, where E is the epicyclic ratio. Further change in the attitude of the rollers 8 in the assembly 5 now causes the epicyclic sun gear to rotate in the same direction as the gear 20 (i.e. the same direction as the main shaft 1) and therefore its speed augments rather than lessens the speed of the carrier 17. By this means the output epicyclic carrier speed ratio can be increased to 1:1. At this point a clutch C3 disposed between carrier 17 and flange 21 can be engaged to provide, between input shaft 1 and output shaft 18, a nearly loss-free direct transmission. In this condition the rolling assembly runs at the correct transmission ratio but under no load.

Thus the system is useful when a wide total range of transmission ratio is required but a main long term power output is at a substantially constant transmission ratio.

The flange 26 may be restrained, for example by means of a band brake B4. In this way one can provide another, indirect, low-loss speed ratio. When gear 25 is stationary, the gear 22 constitutes a fixed reaction member for the output epicyclic gear train through which the input shaft drives the carrier 17 and thence the output shaft. The ratio depends on the epicyclic ratio: if this is 3, for example, the output speed is $\frac{3}{4}$ of the input speed. The arrangement facilitates the use of a mechanical lock B5 for the gear 25 so that a useful transmission ratio is available even if there is hydraulic failure.

If both clutches C1 and C2 are engaged together, the epicyclic output gear train has its sun gear 22 and its epicyclic carrier 17 locked together at a certain speed ratio. The rolling assembly is, therefore at a fixed ratio but under no load and the configuration provides a third low-loss ratio at, for example, $\frac{1}{2}$ the input speed.

If neither of the clutches C1 and C2 is engaged, the sun gear 22 can provide no reaction torque and the carrier 17 is free to turn, being in effect mechanically disconnected.

Figure 2:
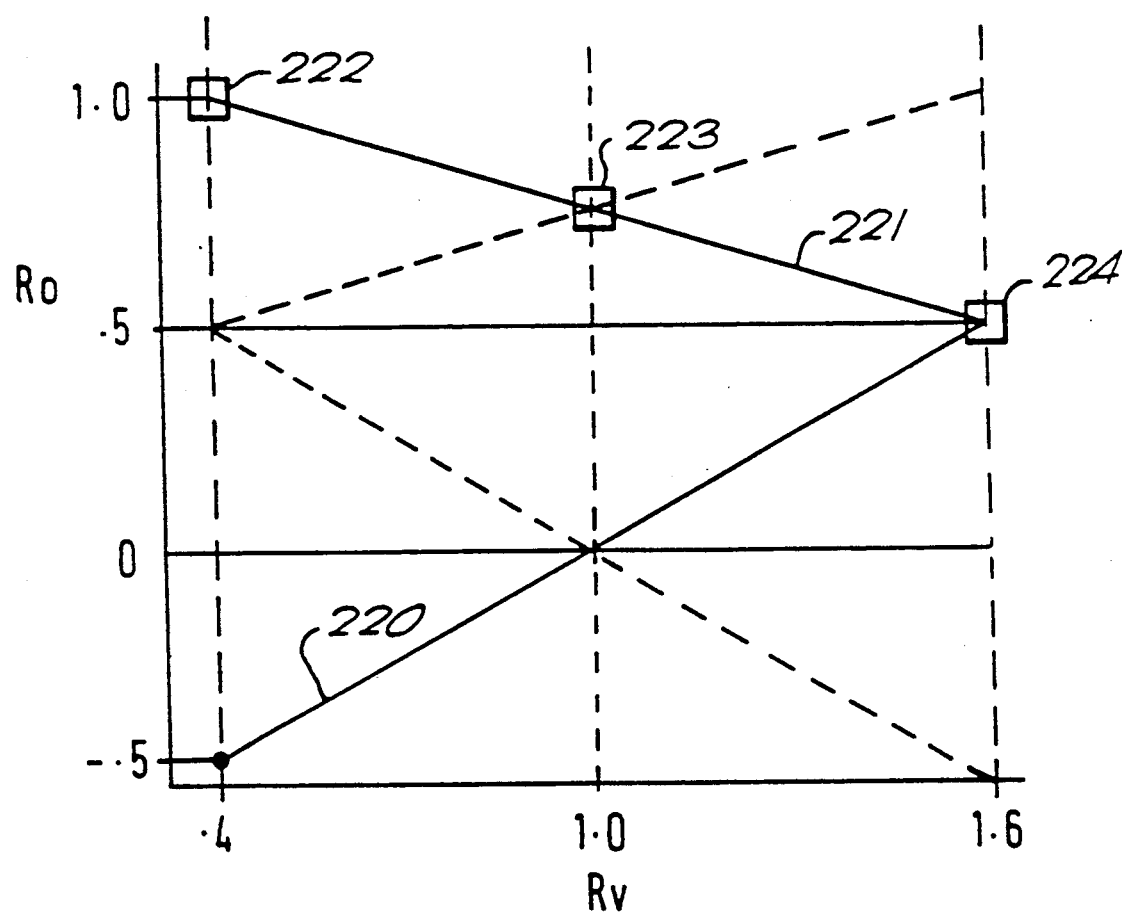
FIG. 2 is a diagram showing the relationship between various transmission ratios in the transmission.

A diagram of the output speed ratio Ro (i.e. the overall ratio) against the rolling assembly's ratio (Rv) is shown in FIG. 2. In this diagram the low regime is indicated by the line 220 and the high regime by line 221 and the fixed ratios at 1:1, 0.75:1 and 0.5:1 by the squares 222, 223 and 224.

An output ratio change between 1:1 and 0.5:1 forwards in high regime is relatively small despite use of the full ratio range (0.4 to 1.6) of the rolling assembly and this system is especially suited to installations where the main duty involves output torque requirements varying strongly with speed (such as with fan and propeller drives in which the required torque varies approximately as speed squared). The proportion of input power taken at 1:1 ratio is low (with the numbers given by way of example, it is $\frac{1}{4}\times$ input power). But at the synchronous ratio (the boundary between regimes) it is high, assuming a constant input power. However, since synchronous output speed is only $\frac{1}{2}\times$ input, the output power involved is about $(\frac{1}{2})$ squared or $\frac{1}{4}$ of full power and the actual torques transmitted by the rolling assembly are therefore moderate over the whole working range.

By changing the connections of the sun gear 22 by way of gears 15 and 25, the synchronous ratio can be arranged to occur at a low rolling assembly speed ratio instead of a high one if the output requirements were best provided that way. This alternative is shown dotted in the diagram of FIG. 2.

As described therefore the final epicyclic train may be either by-passed (by operation of clutch C3) or partially inhibited (by brake B4 or clutches C1 and C2) to provide at least one fixed ratio of low loss.

Each of the clutches C1, C2 and C3 is preferably hydraulically operated. Clutch C1 has a hydraulic chamber 31 connected by way of passageway 32 through shaft 12 to the annular passageway 33, connected to a controlled pressure supply (not shown). Similarly, chamber 34 for clutch C2 is connected by way of passageway 35 in shaft 12 to passageway 36 likewise connected to a further source of controlled pressure and clutch C3 has chamber 37 connected by way of passage 38 in shaft 18 to the annular passageway 39 and its supply of operating pressure.

Figure 3:
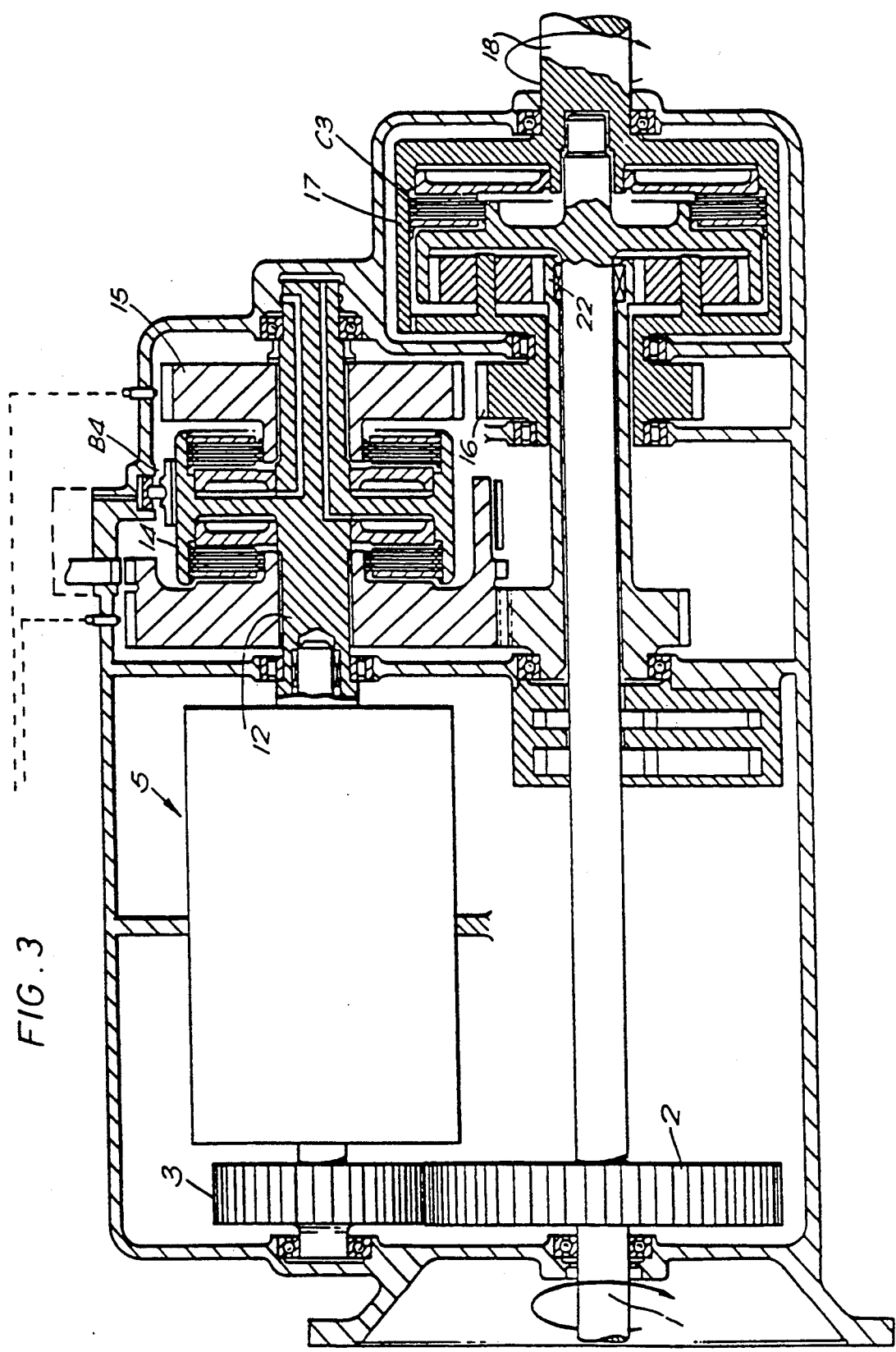
FIG. 3 illustrates a modification of the transmission of FIG. 1.

FIG. 3 shows a modification of the transmission shown in FIG. 1 and is shown in simplified form for convenience. In this modification, the break band B4 does not engage any flange on the gear 25 but instead engages the outer periphery of the T-flange 14 provided on the shaft 12. This modification has the advantage of interposing a clutch between the brake band and the output (propeller) shaft 18. The clutch C2 may now be used as an overload protection in the 'high' regime, a function which is difficult for a brake band with high servo action.

Figure 4:
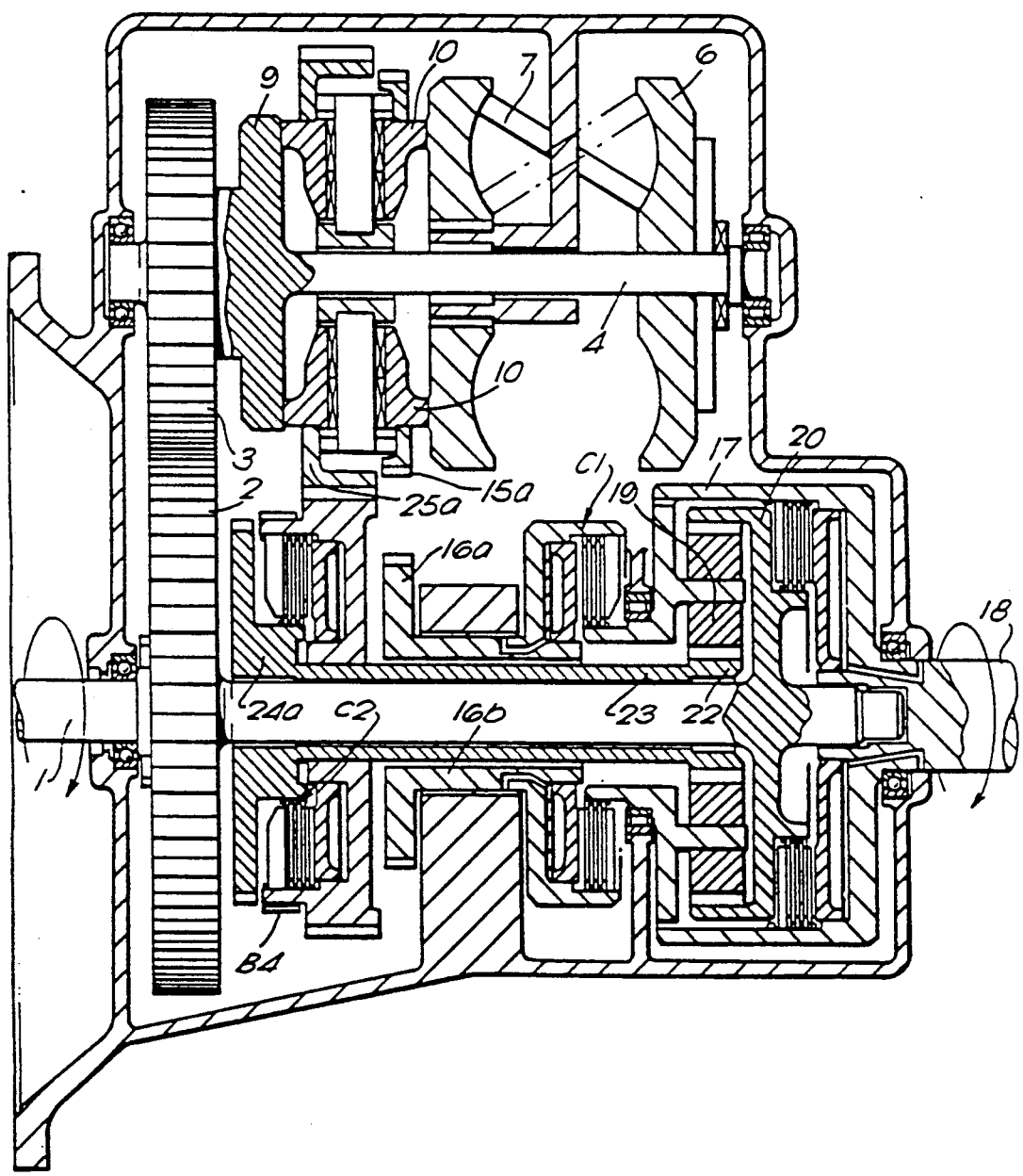
FIG. 4 illustrates another embodiment of the invention.

A further embodiment of the invention is shown in FIG. 4. This embodiment is kinematically similar to the embodiment shown in FIG. 3 and where the parts perform the same function, they are designated by identical reference numerals in the drawing.

However, the embodiment shown in FIG. 4 is more compact than the embodiment shown in the earlier figures, because the clutches C1 and C2 are provided on the lay shaft instead of at the end of the rolling assembly (5).

Thus in the embodiment shown in FIG. 4, the input shaft 1 has at its input end the gear 2 which meshes with an input gear 3 on the shaft 4 that extends through the rolling traction unit 5. This has discs 6 and 7 and rollers 8 arranged similarly to the parts of the unit 5 shown in FIG. 1. However, in this arrangement the epicyclic gears 10 engage the rear surface of the disc 7 and the disc 9 which is now adjacent to the gear 3.

Instead of the connection from the shaft 12 in FIG. 1 by way of clutch C1, gears 15 and 16 and extension 12 to the output propeller shaft 18, the epicyclic carrier includes gear 15a which is coupled by a chain (or idler gear) to gear 16a on the sleeve 16b, which includes the chamber 31 for clutch C1 that connects sleeve 16b to the extension 17 of the output propeller shaft 18.

Also, instead of the connection from flange 14 through clutch C2 to gear 25, and hence to gear 24 to the sun 22 of the output epicyclic gear train, the epicyclic carrier of the roller epicyclic includes gear 25a which meshes with gear 25b rotatable on sleeve 23. Gear 25b may be engaged by way of clutch C2 to the disc 24a which is part of the sleeve 23 carrying the sun 22.

The arrangement of the output epicyclic, and the clutch C3 is otherwise the same as previously described with reference to FIG. 1.

Figure 5:
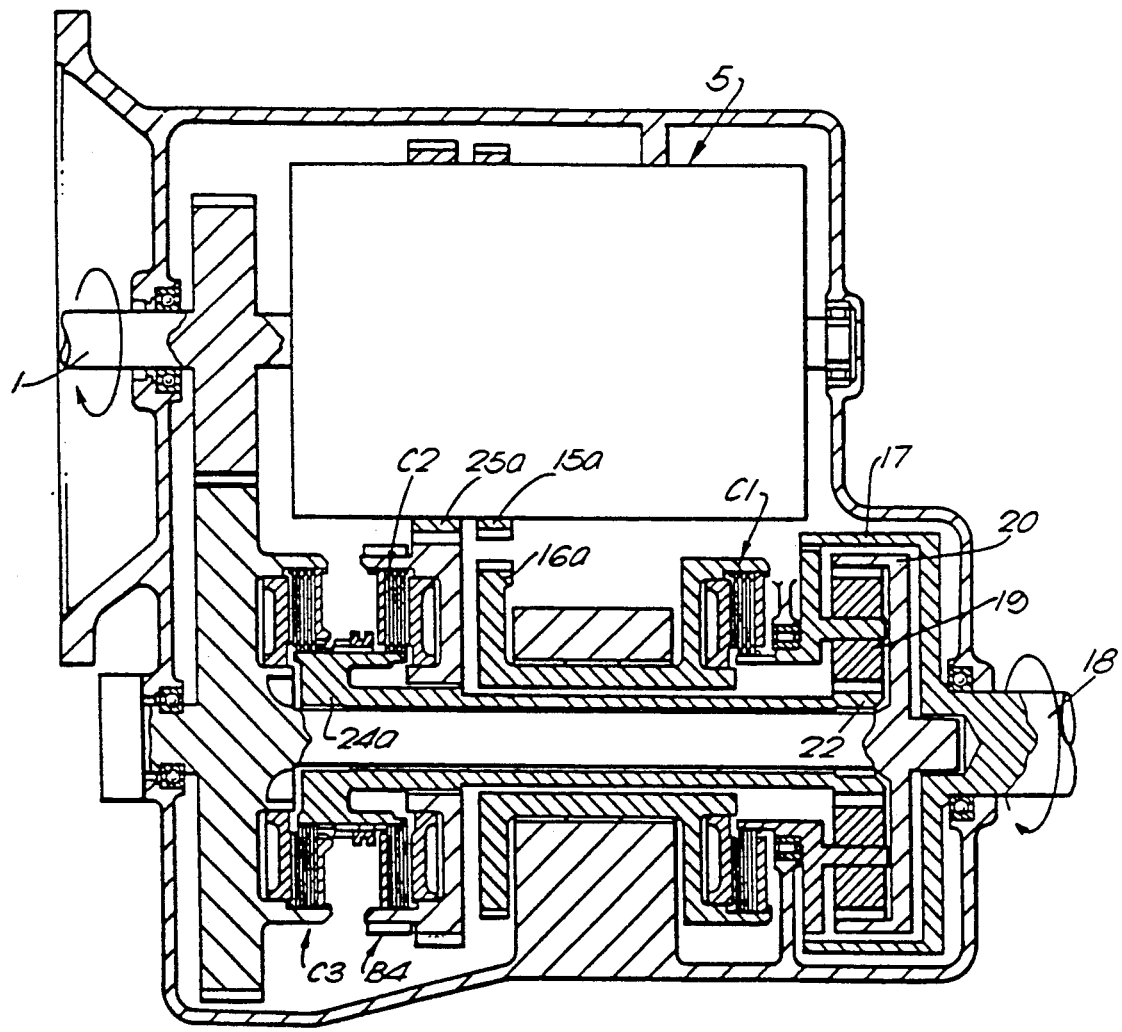
FIG. 5 illustrates a further embodiment of the invention.

The embodiment shown in FIG. 5 illustrates an alternative arrangement wherein direct lock-up is provided by clutching between the sun 22 and annulus 20 of the epicyclic and hence input shaft 1, whereas in FIG. 4 lock-up was provided by clutching between carrier 17 and annulus 20 and hence input shaft 1.

In the embodiment shown in FIG. 5, since both gears 25a and 15a on the variable unit are attached to the same carrier output of the roller epicyclic, locking the sun 22 to be held stationary to the casing by brake band B4 may also be accomplished by placing the brake band on the outside of clutch C1 instead of clutch C2, if preferable for packaging reasons.

I claim:

1. A transmission comprising an input rotary member (1), an output rotary member (17, 18), a variable ratio unit (5) driven by the input member and adjustable to provide a transmission ratio, between the input member and an intermediate member (12 or 12a), which is continuously variable throughout a range, a first transmission coupling (C1, 15, 16, 17 or 15a, 16a, C1, 17) connectable between the intermediate member and the output member, a second transmission coupling (C2, 25, 24 or 25a, 25b, C2, 24a) connectable between the intermediate member and a rotary gear member (22) which is disposed in an epicyclic gear stage, the output rotary member including a carrier (17) for an epicyclic gear (19) between the said rotary gear member and a geared member (20, 21) driven by the input member (1) and means (C3 or B4, C2 or C1, C2) operable to inhibit at least partially the epicyclic action of the epicyclic gear stage, so as to bypass the variable ratio unit and to provide a fixed overall transmission ratio within a range of continuously variable overall transmission ratios.

2. A transmission according to claim 1 in which the unit (5) comprises a toroidal race rolling traction assembly having an input disc (6) and an output disc (7) defining a toroidal race and adjustable rollers (8) between the discs, and an epicyclic roller stage including an epicyclic carrier constituting or connected to the intermediate member (12 or 12a), the assembly being configured to have a geared idle condition.

3. A transmission according to claim 1 in which the said means comprises a clutch (C3) for coupling the geared member (20, 21) to the output rotary member (17, 18).

4. A transmission according to claim 1 wherein means are provided for inhibiting rotation of the said rotary member (22).

5. A transmission according to claim 1 in which the first and second transmission couplings are engageable simultaneously effectively to lock together the said carrier (17) and rotary member (22).

6. A transmission comprising an input rotary member (1), an output rotary member (17,18), a variable ratio unit (5) driven by the input member and adjustable to provide a transmission ratio, between the input member and an intermediate member (12 or 12a), which is continuously variable throughout a range, said unit (5) including a toroidal race rolling traction assembly having an input disc (6) and an output disc (7) defining a toroidal race and adjustable rollers (8) between the discs, and an epicyclic roller stage including an epicyclic carrier constituting or connected to the intermediate member (12 or 12a), the assembly being configured to have a geared idle condition; a first transmission coupling (C1, 15, 16, 17, or 15a, 16a, C1, 17) connectable between the intermediate member and the output member; a second transmission coupling (C2, 25, 24 or 25a, 25b, C2, 24a) connectable between the intermediate member and a rotary gear member (22) which is disposed in an epicyclic gear stage, the output rotary member including a carrier (17) for an epicyclic gear (19) between the said rotary gear member and a geared member (20,21) driven by the input member 91); and means comprising a clutch (C3) for coupling the geared member (20,21) to the output rotary member (17,18), said means being operable to inhibit at least partially the epicyclic action of the epicyclic gear stage, so as to bypass the variable ratio unit and to provide a fixed overall transmission ratio within a range of continuously variable overall transmission ratios.

* * * * *